US006571819B1

(12) United States Patent
Capoferi

(10) Patent No.: US 6,571,819 B1
(45) Date of Patent: Jun. 3, 2003

(54) METHOD OF INSTALLING VALVE SEALS AND A TWO-PIECE TOOL THEREFOR

(76) Inventor: Fred Louis Capoferi, 11175 Erdman, Sterling Heights, MI (US) 48314

( * ) Notice: Subject to any disclaimer, the term of this patent is extended or adjusted under 35 U.S.C. 154(b) by 0 days.

(21) Appl. No.: 10/096,976

(22) Filed: Mar. 14, 2002

(51) Int. Cl.[7] ......................... F16K 43/00; B23P 19/04; B23P 19/12; F16J 15/24; F02F 11/00

(52) U.S. Cl. ................................ 137/315.41; 29/213.1; 29/214; 29/235; 29/278; 137/15.18; 251/214; 277/313; 277/511; 277/598

(58) Field of Search ................................ 29/213.1, 214, 29/221.6, 235, 270, 278, 280, 282, 700; 123/90.1, 90.48; 137/15.01, 15.08, 15.18, 315.01, 315.41, 315.42; 251/214; 277/312, 313, 370, 511, 591, 598

(56) References Cited

U.S. PATENT DOCUMENTS 1,930,982 A * 10/1933 Norris ........................ 277/329
3,274,674 A * 9/1966 Hooper ........................ 29/214
3,793,999 A * 2/1974 Seiler et al. .................. 29/214
4,351,512 A * 9/1982 Siver .......................... 251/214
4,356,832 A * 11/1982 Velan ......................... 251/214
4,394,872 A * 7/1983 Schobl ....................... 251/214
4,843,668 A * 7/1989 Bondar ........................ 29/235
5,107,882 A * 4/1992 Carroll ........................ 29/235
5,207,196 A * 5/1993 Kuonen ....................... 29/214
5,299,347 A * 4/1994 Decker ........................ 29/235
5,353,489 A * 10/1994 Weaver ....................... 29/235
5,355,572 A * 10/1994 Kammeraad et al. ......... 29/214
6,023,826 A * 2/2000 Harrelson, III et al. .... 29/213.1
6,349,459 B1 * 2/2002 Dean .......................... 29/235

* cited by examiner

*Primary Examiner*—George L. Walton
(74) *Attorney, Agent, or Firm*—Hall, Priddy, Myers & Vande Sande

(57) ABSTRACT

A method of installing a valve seal at the base of a valve stem of an automotive internal combustion engine is disclosed. A two-piece tool consisting of first and second tool parts is employed for carrying out the method. The first tool part is used to push upon the valve seal while the second tool part is engaged over the free end of the valve stem and guides the movement of the first tool part as it pushes upon the valve seal. The method employs a coaxial assembly to keep square the pushing upon the valve seal by the first tool part consisting both of the slidable engagement between the two tool parts and of the fixed engagement between the second tool part and the valve stem.

9 Claims, 7 Drawing Sheets

METHOD OF INSTALLING VALVE SEALS AND A TWO-PIECE TOOL THEREFOR

SPECIFICATION

My invention relates to automotive internal combustion engines.

The principal object thereof is to provide a method of installing valve seals on valve stems of such engines and to provide a two-piece tool for carrying out said method.

BACKGROUND OF INVENTION

In the United States alone there are approximately 25,000 engine rebuilding shops, all of whom are capable of installing a valve seal made by Dana Corporation called "Perfect Circle" (a trademark). Upon a customer's request, a rebuild shop will install this "Perfect Circle" brand of valve seals which are desirable because of their superior quality and durability, if properly seated.

Currently, Dana Corporation supplies these installers with a plastic sleeve that fits over the end of a valve stem, but are otherwise they are left to their own skill and ingenuity in installing such valve seals. The procedures used are not consistent and sometimes seals end up damaged or not properly seated. With the two-piece tool that I provide by my invention, it is impossible to damage the seal during the installation process and perfect seating is accomplished in each instance.

BRIEF DESCRIPTION OF THE DRAWINGS

The foregoing object of my invention and the advantages thereof will become apparent during the course of the following description, taken in conjunction with the accompanying drawings, in which.

DETAILED DESCRIPTION OF MY INVENTION

Figure 10:
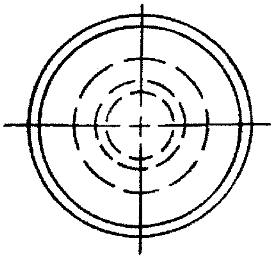
FIGS. 9 and 10 are opposite end views, respectively, of the tool part shown in FIG. 8.
Figure 8:
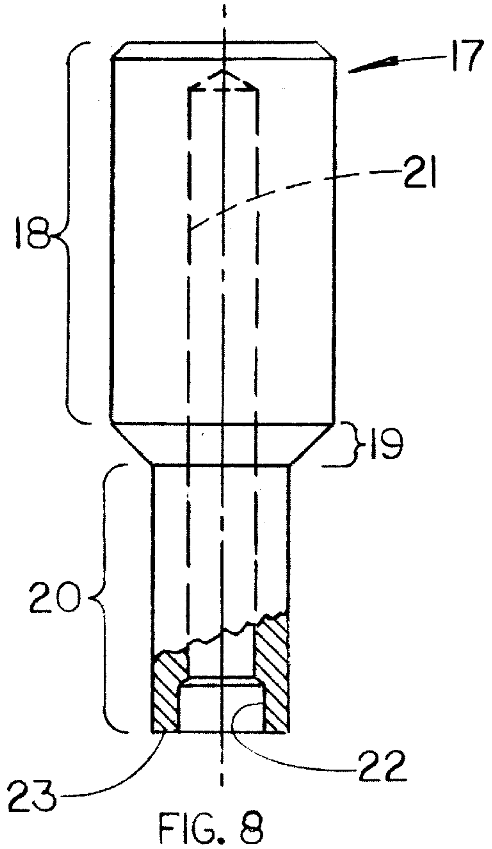
FIG. 8 is a side elevational view of one part of a two-piece tool embodying my invention.
Figure 9:
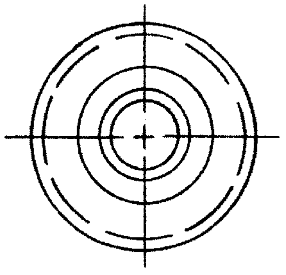

Referring to the drawings in greater detail, one tool part of my two-piece tool is generally designated 17 (FIGS. 8–10) and comprises a handle portion 18, a taper 19 and a neck portion 20. The tool part 17 opens inwardly from the front thereof via a blind-ended drilled hole 21 in which is counter-drilled a hole 22 coaxial with but of lesser length and greater diameter than the hole 21. The annular end of the hole 22 provides a pusher surface 23 for pushing upon an external surface of a valve seal to be seated.

Figure 13:
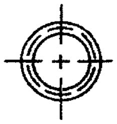
FIGS. 12 and 13 are opposite end views, respectively, of the tool part shown in FIG. 11.
Figure 11:
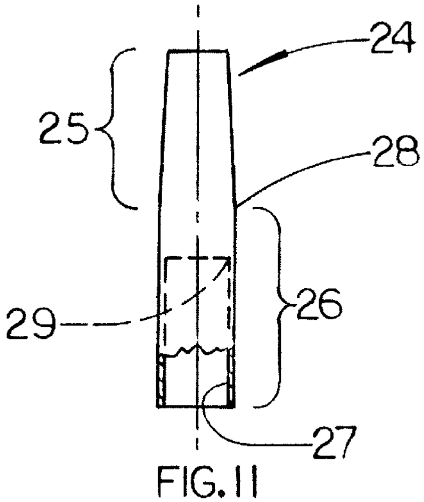
FIG. 11 is a side elevational view of the other tool part of the two-piece tool embodying my invention.
Figure 12:
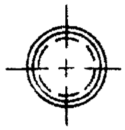

The other tool part of my two-piece tool is generally designated 24 (FIGS. 11–13) and comprises a tapered portion 25 and a cylindrical guide portion 26. The tool part 24 opens inwardly from the rear thereof via a blind-ended bore 27 and has a radius 28 at the base of the taper 25 to assist the valve seal in moving from the taper 25 unto the cylindrical guide portion 26. A radius 29 is provided at the blind end of the bore 27 to strengthen the wall thickness thereof.

Figure 1:
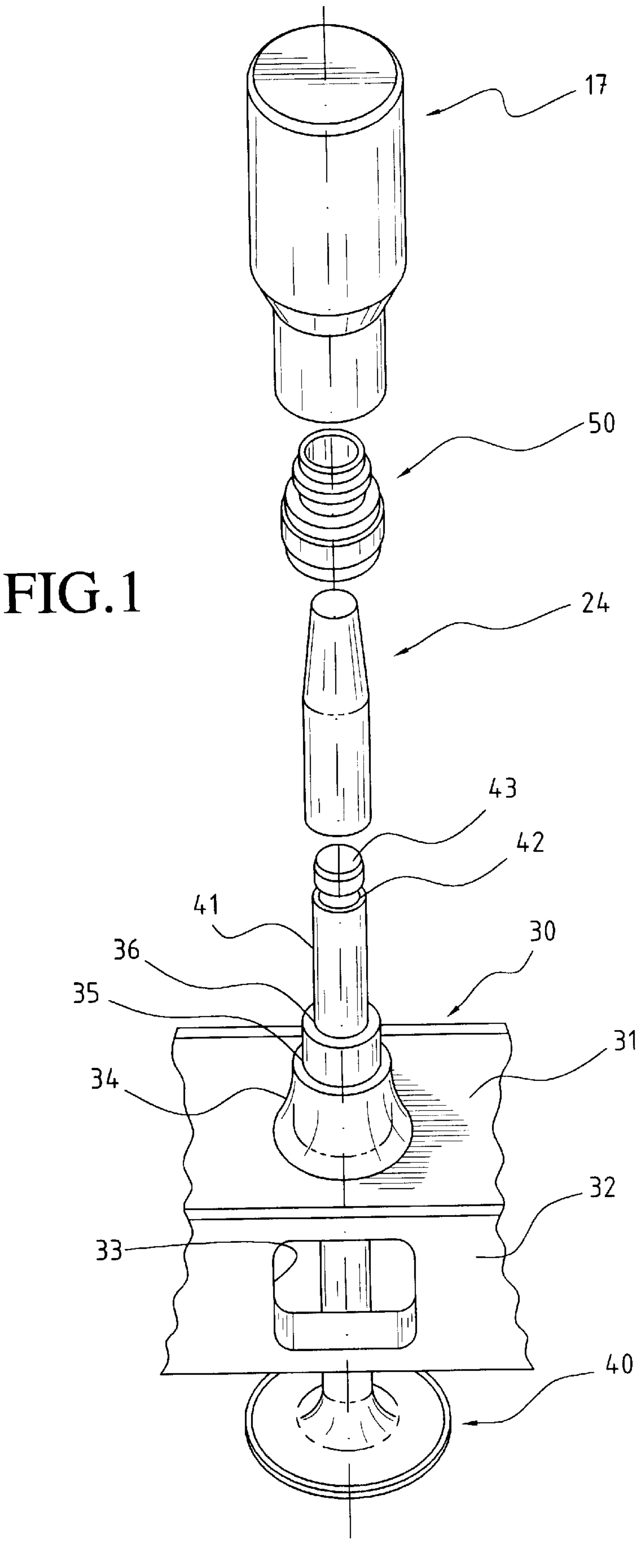
FIG. 1 is an exploded perspective view illustrating the method of my invention.

FIG. 1 illustrates the installation of a "Perfect Circle" valve seal on a valve stem of an internal combustion engine. 50 designates said seal to be installed .30 designates an automotive cylinder head with a top wall 31, a side wall 32, a port 33 and a valve guide structure 34. The valve guide structure 34 is machined with a cutter tool to provide a cylindrical portion 35 thereof in accordance with the present practice of installing valve seals.36 designates the top step of the machined portion 35. 40 designates an automotive valve which includes a valve stem 41 having a lock groove 42 formed near the free end thereof, designated 43.

Figure 16:
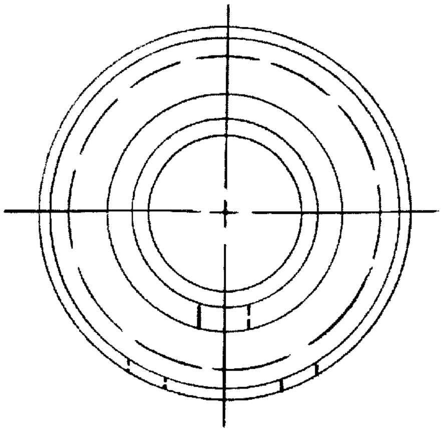
FIGS. 15 and 16 are opposite end views, respectively, of the valve seal shown in FIG. 14.
Figure 14:
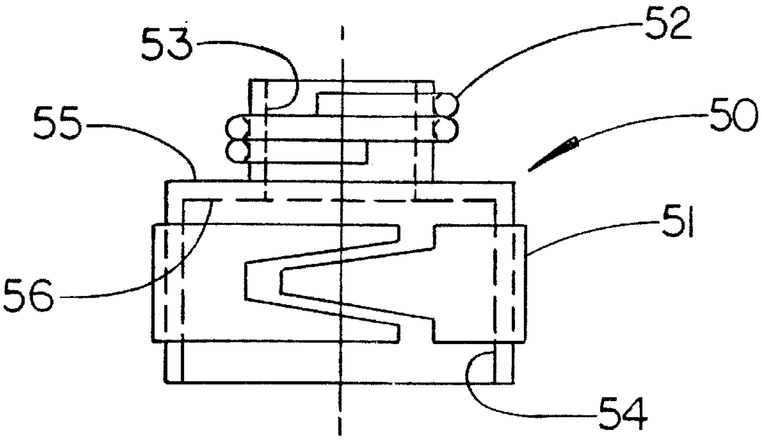
FIG. 14 is a side elevational view of said "Perfect Circle" valve seal.
Figure 15:
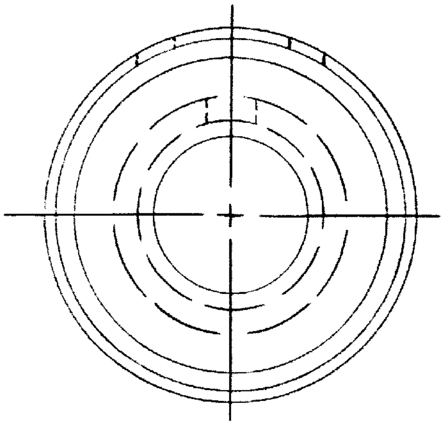

The seal 50 (FIGS. 14–16) has an expandable compression band 51, an expandable compression wire 52, a press fit hole 53 for mating with the valve stem 41 and a press fit hole 54 for mating with the machined cylindrical portion 35. Said seal 50 has an external surface 55 against which the pusher surface 23 engages. An internal surface 56 of the seal 50 seats against the top step 36.

THE METHOD OF MY INVENTION

The method of my invention for installing said seal 50 on a valve stem of an automotive cylinder head using my two-piece tool is as set forth below.

We must assume that the valve stem 41 has been inserted through the valve stem guide structure 34 and that the latter has been machined to provide the cylindrical portion 35 and the top step 36.

In FIGS. 2–7, the tool parts 17 and 24, the cylinder head 30, the valve 40, the valve seal 50 are not cross-hatched for purposes of clarity of illustration.

STEP NUMBER 1 (FIG. 2)

The tool part 24 is inserted over the free end 43 of the valve stem 41 to cover it and the lock groove 42. The bore 27 is made with a close tolerance in respect to the diameter of the particular valve stem 41 with which it is to be used.

STEP NUMBER 2 (FIG. 3)

Press fit hole 53 of said seal 50 is inserted over the tapered portion 25 of the tool part 24.

STEP NUMBER 3 (FIG. 4)

Counter-drilled hole 22 of tool part 17 is slipped over the expandable compression wire 52 of seal 50 until the pusher surface 23 thereof engages the external surface 55 of the seal 50. At this point, with the seal 50 disposed on the taper 25, it is now ready for movement.

STEP NUMBER 4 (FIG. 5)

Now by exerting a force on the tool part 17, the seal 50, via the press fit hole 53, is smoothly moved from the taper 25 onto the external guide portion 26 of tool part 24. Also at this time, the drilled hole 21 has slidably engaged the external guide portion 26 of tool part 24 and forms therewith a coaxial assembly consisting of the slidable engagement between the tool parts 17 and 24 and the fixed engagement between the tool part 24 and the valve stem 41. At this point, the pusher surface 23 is located just above the rear end of the tool part 24. With the assembly being coaxial, the pusher surface 23 squarely and firmly engages surface 55 during the remainder of the travel of seal 50.

STEP NUMBER 5 (FIG. 6)

Continued force upon the tool part 17 slides the seal 50, via the press fit hole 53, off the external guide portion 26 and unto the valve stem 41. In so moving, the seal 50 has safely passed over the valve stem end 43 and over the lock groove 42 without any possibility of being damaged thereby.

STEP NUMBER 6 (FIG. 7)

Continued force upon the tool part 17 slides the seal 50, via the press fit hole 53, down the valve stem 41 until the press fit hole 54 engages the cylindrical machined portion 35. Continued force upon the seal 50, via the pusher surface 23, moves it over cylindrical portion 35 and completes the seating thereof, at which point the internal seating surface 56 is bottomed out on the top step 36.

REVIEW

Figure 5:
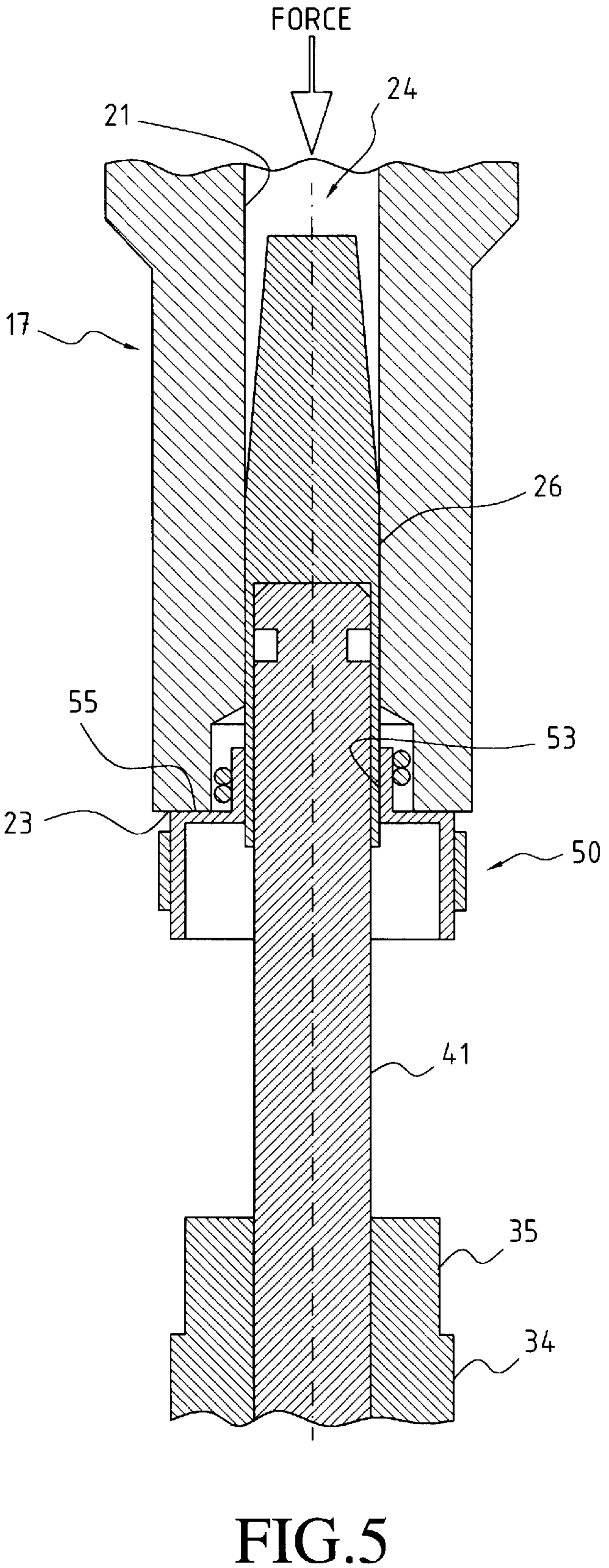
Figure 6:
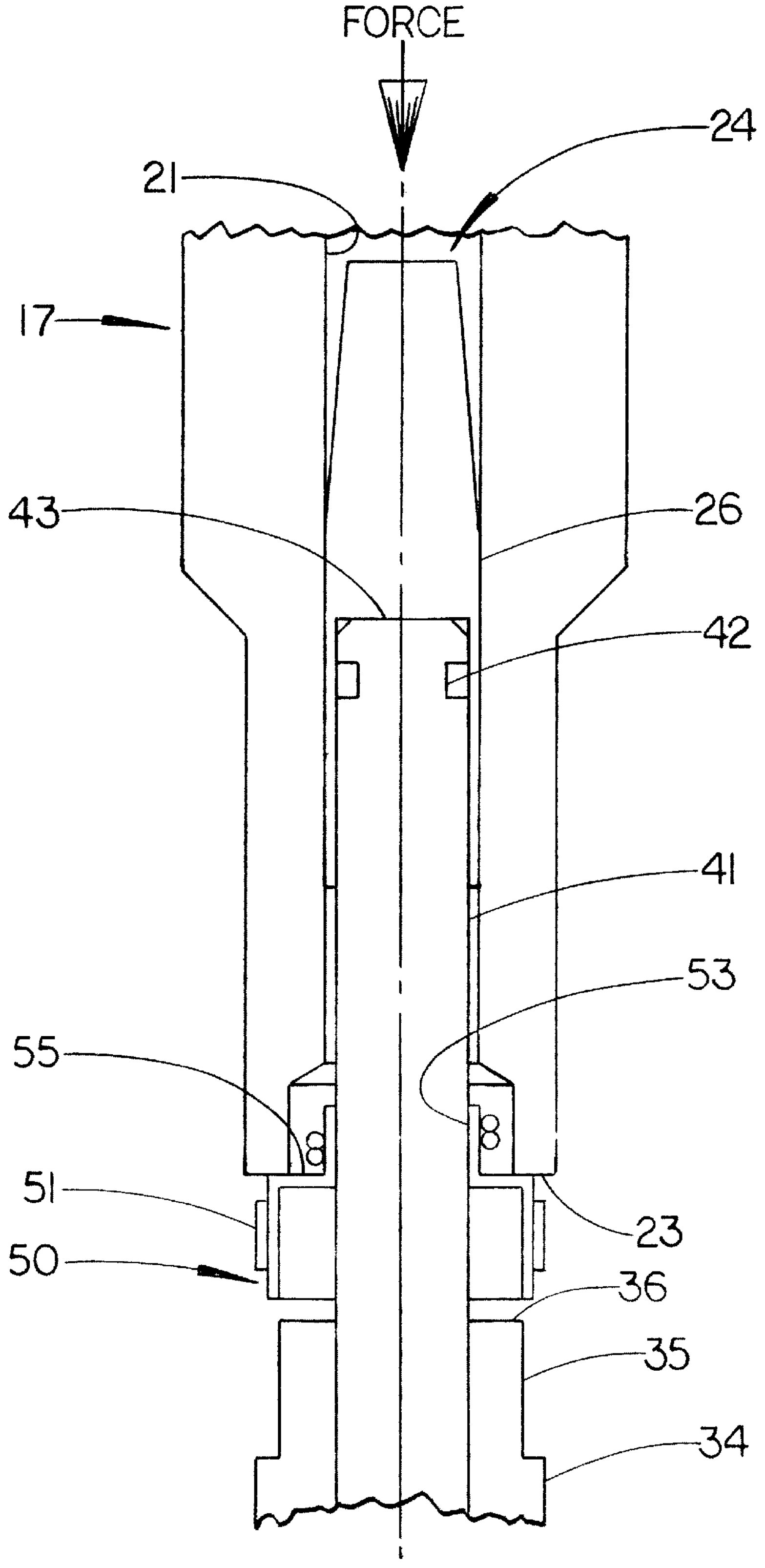
Figure 7:
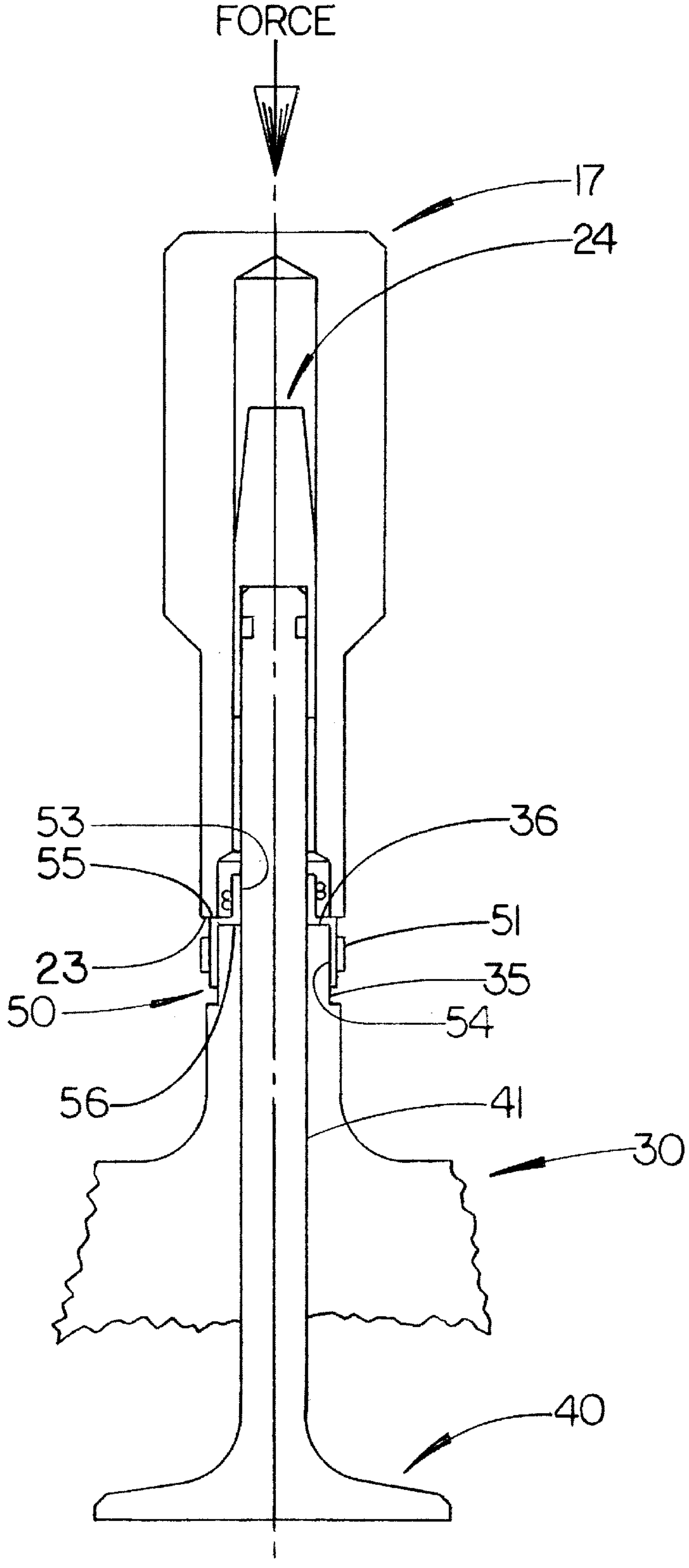

During the installation process, when the drilled hole 21 in tool part 17 slidably engages the external guide portion 26 of tool part 24, the two tool parts become a precision-fit coaxial assembly as mentioned and as best shown in FIGS. 5–7. Further movement of tool part 17 in respect to tool part 24 is guided along its path of travel by the cylindrical surface 26 of tool part 24, thereby eliminating any possibility of misalign-ment during installation of said seal 50.

Figure 2:
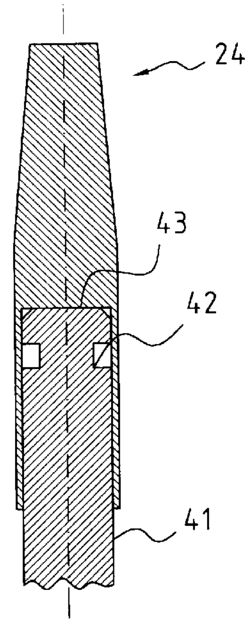
FIGS. 2–7 are respective central sectional views (with parts not cross-hatched) further illustrating the method of my invention.

In the first instance, all possibility of damage to seal 50 is prevented by tool part 24 covering the valve stem end 43 and lock groove 42 as best shown in FIG. 2.

Figure 3:
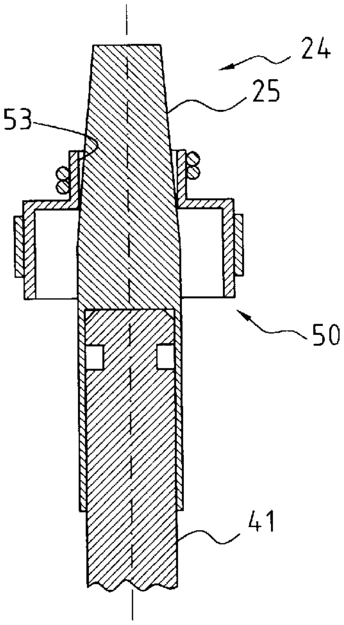
Figure 4:
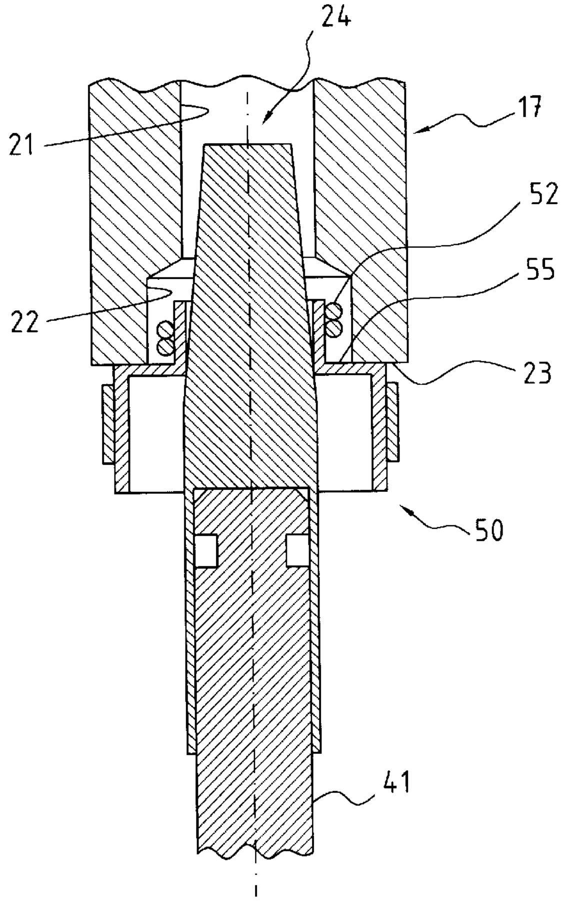

In the second instance, the tapered portion 25 of tool part 24 serves as a pilot for the engagement with the tool part 17 bestt shown in FIG. 3. As seal 50 is moved downwardly of the taper 25, the spring 52 is gradually expanded thereby so that the seal 50 moves smoothly (with assist from the radius 28) from the taper 25 onto the cylindrical guide portion 26 as best shown in FIG. 4 and 5.

In the third instance, movement of seal 50 over the length of tool part 24 is kept square when the hole 21 slidably engages cylindrical portion 26 (FIG. 5) and the two tool parts 17 and 24 remain so engaged during the remainder of the installation process. The tolerance between hole 21 and cylindrical portion 26 is designed and held so that precision alignment takes place during such slidable movement of tool part 17 over tool part 24.

In the fourth instance, continued movement of seal 50 along valve stem 41 (FIG. 6) is kept square by reason of the interaction of hole 21 and cylindrical portion 26 and the close tolerance between them. In FIG. 6, the bottom end of the seal 50 is poised just above the top seat 36 ready for commencement of the final bottoming step.

In the fifth instance, at the point where the seal 50 is being moved from its position in FIG. 6 toward its final bottomed position in FIG. 7, the seal 50 starts to engage machined portion 35. At this point, when the compression band 51 must be expanded, it is critical that seal 50 be held square while it is slid over machined portion 35. Again, such square alignment is insured by reason of the slidable engagement between the hole 21 and cylindrical portion 26 and the close tolerance between them.

In the sixth and final instance, during bottoming of seal 50, its travel toward top seat 36 is maintained square by reason of the interaction of hole 21 and cylindrical portion 26 and the close tolerance between them. Bottoming of seal 50 as shown in FIG. 7 is perfect because the force used to effect its final seating has been kept square by reason of the interaction of hole 21 and cylindrical portion 26 and the close tolerance between them.

SUMMARY

Tool part 17 allows the mechanic to grip it firmly and when engaged with tool part 24 gives him a feel in his hand for the precision alignment that is occurring as tool part 17 slides over tool part 24 during movement of seal 50 and enables him to determine when, and how much, force should be applied during each of the steps 3 through 6. Especially is this feel of precision alignment and force to be applied by the mechanic critical for final bottoming of said seal 50.

Different sizes of my two-piece tool are provided to accommodate the different size valve stems 41 encountered in practice, the seals of which may be in need of replacement.

The following chart is a step by step comparison between my invention and the prior art as I know it.

| | My Invention | Prior Art as I know it |
|---|---|---|
| Step #1 | Tool part 24, with its tapered lead, is slipped over the end of valve stem 43 covering it and the lock groove 42. | A plastic sleeve with no tapered lead is slipped over the end of the valve stem 43 covering it and the lock groove 42. |
| Step #2 | Press fit hole 53 of said seal 50 is manually slipped over the tapered portion 25 of tool part 24. | Because the diameter of the plastic sleeve is greater than that of press fit hole 53, only the large diameter 54 of said seal 50 can be slipped thereover (over the plastic sleeve). |
| Step #3 | Counter-drilled hole 22 of tool part 17 is slipped over the expandable compression wire 52 of said seal 50 until the pusher surface 23 comes in contact with the external surface 55 of said seal 50. | The handle of a screw driver is usually employed and positioned directly above and touching the top end of said seal 50. |
| Step #4 | Exerting a force on tool part 17 results in said seal 50 making a smooth transition from the taper portion 25 to the external guide portion 26 of tool part 24. During | Exerting a force on the handle of a screw driver will force the said seal 50 onto the valve stem end 43 with the plastic sleeve there between. The screw driver is now set aside. |

-continued

| | My Invention | Prior Art as I know it |
|---|---|---|
| | this travel, drilled hole 21 of tool part 17 has engaged the external guide portion 26 of tool part 24 making tool part 17 and tool part 24 coaxial. | Said seal 50 is manually forced directly onto the plastic sleeve to expand wire ring 52 without a transition taper. Damage to said seal 50 may occur at this point. |
| Step #5 | Continued force on tool part 17 moves said seal 50 along its path until it slips off of tool part 24 and onto the valve stem 41 and has passed over the lock groove 42 without incurring any damage whatever because my two-piece tool is coaxial and my substitute for the plastic sleeve (tool part 24) is rigid. | Now using one's hands (no tool) a force is exerted on said seal 50 moving it along the plastic sleeve until it encounters lock groove 42. Since the plastic sleeve is flexible it is capable of collapsing radially from the force of wire ring 52. When this occurs, said seal 50 tends to become hooked on the lock groove 42. More force and some unwanted manipulation is necessary to pass said seal 50 over the lock groove 42 and off the plastic sleeve and onto the valve stem 41. If said seal 50 is forced over lock groove 42 while misaligned, damage to said seal 50 may occur. |
| Step #6 | Continued force results in said seal 50 being slid down valve stem 41 until hole 54 in said seal 50 encounters machined portion 35 of valve guide 34. At this point more force is required to send said seal 50 to it's final seated (bottomed out) position. It is critical that this increased force be delivered squarely to avoid damage to said seal 50. Because my two-piece tool is coaxial, said seal 50 has been sent to its final seated position without incurring any damage whatever. The increased force required to send said seal 50 to its final seated position is made feelable and reassuring because of the precision alignment between tool parts 17 and 24. | Still using one's hands (no tool) said seal 50 is slid along valve stem 41 until hole 54 in said seal 50 encounters machined portion 35. At this point, more force is required to send said seal 50 to its final seated (bottomed out) position and this cannot be accomplished using one's hands with no tool. A variety of implements have been employed to obtain the final seated position of said seal 50, but all have the potential to damage said seal 50 during the final seating step or to improperly seat it. |

While I have shown and described the method of my invention and a two-piece tool for carrying out said method, it is to be understood that variations and changes my be resorted to without departing from the spirit of my invention as defined by the appended claims.

What I claim is:

1. A method of installing a valve seal at the base of a valve stem of an automotive internal combustion engine using a two-piece tool consisting of first and second tool parts, the first tool part being used to push upon the valve seal while the second tool part is engaged over the free end of the valve stem and guides the movement of the first tool part, said method being commenced by inserting the valve seal over an end of the second tool part before it is pushed upon by the first tool part, said method being continued by pushing upon the first tool part until it slidably engages the second tool part while moving the valve seal off the latter and onto the valve stem, said method being completed by continued pushing upon the first tool part while moving the valve seal down the valve stem and finally seating it at the base thereof, said method employing a coaxial assembly to keep square the pushing upon the valve seal by the first tool part consisting both of the slidable engagement between the two tool parts and of the fixed engagement between the second tool part and the valve stem.

2. A method of installing a valve seal at the base of a valve stem of an automotive internal combustion engine as claimed in claim 1 in which the valve seal has a rear portion carrying a compression wire thereon, said rear portion of the valve seal being confined within the front end of the first tool part while being moved thereby.

3. A method of installing a valve seal at the base of a valve stem of an automotive internal combustion engine as claimed in claim 2 in which the second tool part has a tapered front end which serves as a pilot for engaging the front end of the first tool part and which acts upon said compression wire to gradually expand it as the valve seal moves down and then off said tapered front end.

4. A method of installing a valve seal at the base of a valve stem of an automotive internal combustion engine as claimed in claim 1, said engine having a guide structure at the base of the valve stem and a machined cylindrical portion on said guide structure, said coaxial assembly being employed to keep square the pushing upon the valve seal to move it over said machined cylindrical portion and to bottom it thereupon.

5. A two-piece tool for installing a valve seal at the base of a valve stem of an automotive internal combustion engine consisting of first and second tool parts, the first tool part being used to push upon the valve seal while the second tool part is engaged over the free end of the valve stem and guides the movement of the first tool part, the valve seal being inserted over an end of the second tool part before being pushed upon by the first tool part, pushing upon the first tool part causes it to slidably engage the second tool part while moving the valve seal off the latter and onto the valve stem, continued pushing upon the first tool part moves the valve seal down the valve stem and finally seats it at the base thereof, a coaxial assembly being formed to keep square the pushing upon the valve seal by the first tool part, said coaxial assembly consisting both of the slidable engagement between the two tool parts and the fixed engagement between the second tool part and the valve stem.

6. A two-piece tool for installing a valve seal at the base of a valve stem of an automotive internal combustion engine as claimed in claim 5 in which the valve seal has a rear portion carrying a compression wire thereon, the front end of the first tool part constructed to receive said rear portion of the valve seal within its confines while moving same.

7. A two-piece tool for installing a valve seal at the base of a valve stem of an automotive internal combustion engine as claimed in claim 6 in which the second tool part has a tapered front end which serves as a pilot for engaging the front end of the first tool part and which acts upon said compression wire to gradually expand it as the valve seal moves down and then off said tapered front end.

8. A tool part for installing a valve seal at the base of a valve stem of an automotive internal combustion engine constructed to push upon said valve seal during installation thereof, said tool part having a body having a blind-ended aperture therein opening to the front end thereof, a second aperture in said body coaxial with but of lesser length and greater diameter than the first aperture, the second aperture capable of receiving therein a rear portion of said valve seal, the annular end of the second aperture serving as a pusher surface to push upon an exterior surface of said valve seal.

9. A tool part for installing a valve seal at the base of a valve stem of an automotive internal combustion engine having a body having a cylindrical rear portion, a tapered front end and a blind-ended aperture therein opening to the rear thereof, the process of installing said valve seal being commenced by inserting said tool part, via said aperture therein, over the free end of the valve stem and inserting the valve seal over said taper.

* * * * *